C. F. FILOR.
ADJUSTABLE HANDLE BAR FOR BICYCLES.
APPLICATION FILED NOV. 9, 1920.

1,413,463.

Patented Apr. 18, 1922.
2 SHEETS—SHEET 1.

Inventor
Charles F. Filor.

Witness:
F. L. Foy.

By T. L. Mockabee
Attorney

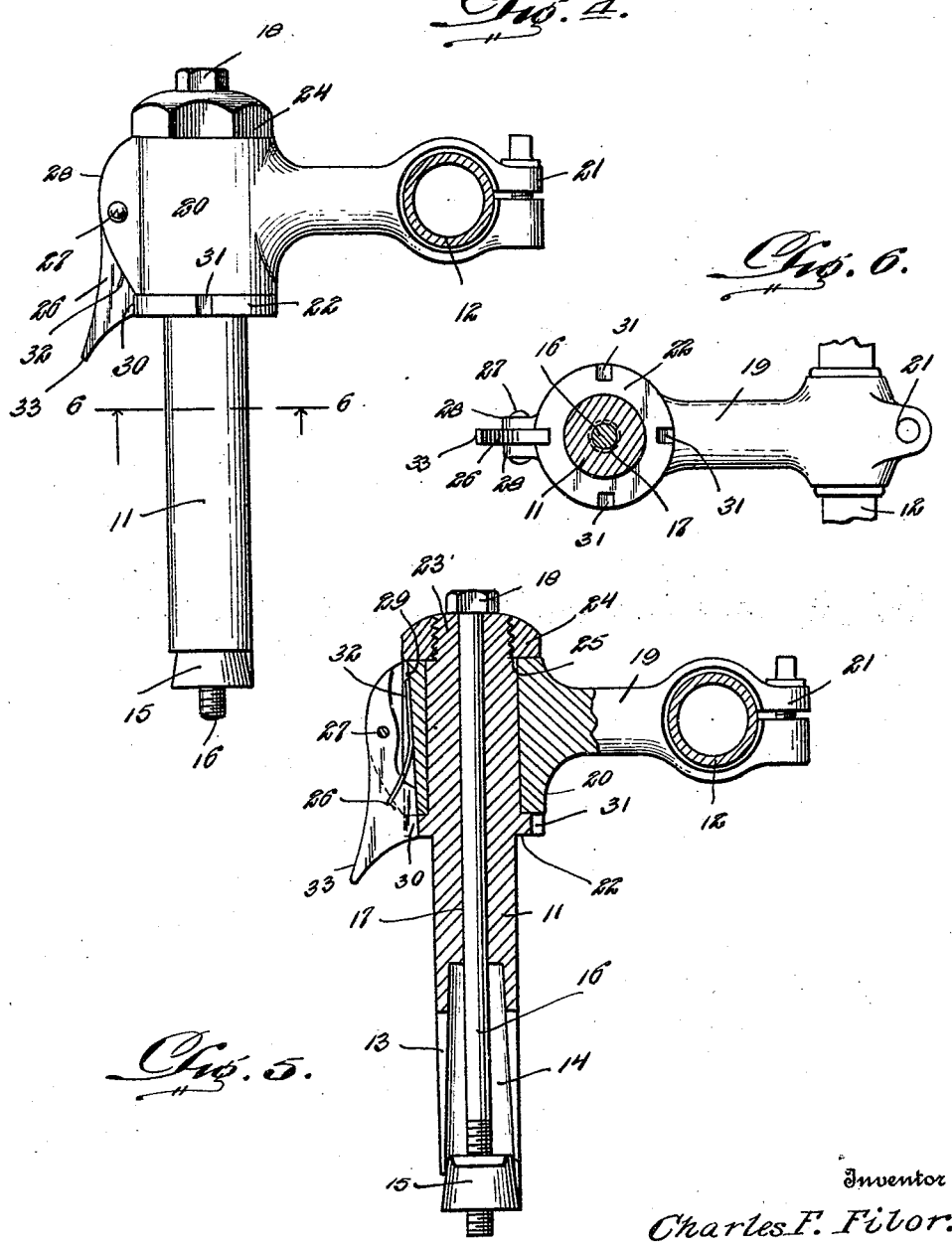

UNITED STATES PATENT OFFICE.

CHARLES F. FILOR, OF TRENTON, NEW JERSEY.

ADJUSTABLE HANDLE BAR FOR BICYCLES.

1,413,463.

Specification of Letters Patent.  Patented Apr. 18, 1922.

Application filed November 9, 1920. Serial No. 422,825.

*To all whom it may concern:*

Be it known that I, CHARLES F. FILOR, a citizen of the United States, residing at Trenton, in the county of Mercer and State of New Jersey, have invented new and useful Improvements in Adjustable Handle Bars for Bicycles, of which the following is a specification.

This invention relates to improvements in bicycles and has for an object the provision of means for securing the handle bars to the bicycle in a manner to permit of horizontal rotary adjustment, whereby the said handle bars may be positioned substantially parallel with the frame, or may be moved to a position reverse from normal. Thus, in the first mentioned position, the bicycle may be supported against a wall or other structure without having one of the bars extending while in the latter position the bars are arranged to afford a change of position to the rider.

Another object of the invention is the provision of means for accomplishing the above in a simple and expeditious manner, the construction being such that the adjustment may be made without loosening the expansible stem of the bolt, the invention being especially adapted for use in connection with the usual expansible stem.

Other objects and advantages of the invention will appear as the following description is read in connection with the accompanying drawings.

In the drawings:—

Figure 4 is an enlarged side elevation of the handle bar stem with the handle bar shown in section.

Figure 5 is a view showing the expansible stem and the swiveled end of its extension in section.

Figure 6 is a section on the line 6—6 of Figure 4 looking in the direction of the arrows.

Figure 1:
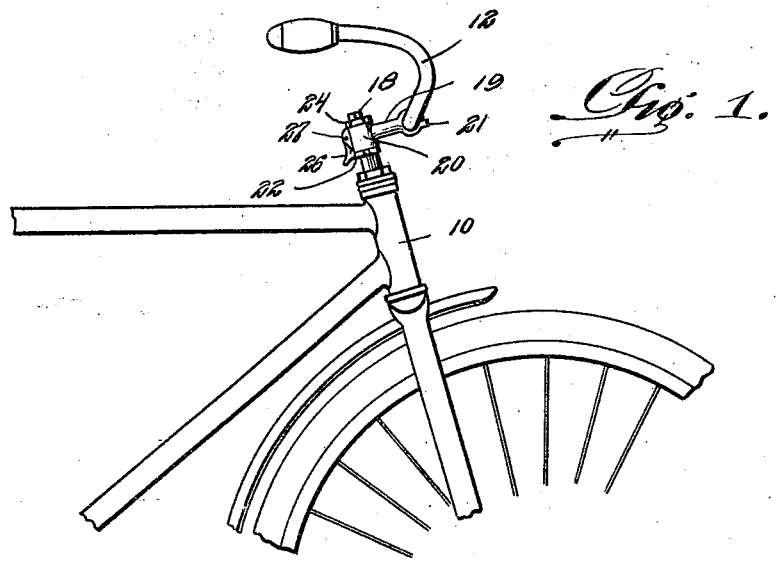
Figure 1 is a fragmentary elevation showing the front portion of a bicycle with the invention applied thereto.

Referring in detail to the drawings wherein like characters of reference denote corresponding parts, the head of the bicycle is indicated at 10. This head may be of the usual construction and is adapted to receive a stem 11 to which is secured the handle bars 12.

The stem 11 is of the usual expansible type, that is, it is provided with oppositely located longitudinally extending slots 13 which communicate with a recess or socket 14, the latter receiving within its lower end a tapered expander plug or nut 15. This plug or nut is mounted upon the threaded end of an expander bolt 16, while the latter passes through the bore 17 of the stem 11 and is provided upon its upper end with a head 18 for engagement with a wrench or other tool. The bolt 16 may thus be rotated to move the plug or nut longitudinally and expand the lower end of the stem 11 into frictional engagement with the head 10 to hold the said stem in its adjusted position, in the usual well known manner.

The present invention resides in means for securing the handle bars of the bicycle to a stem of this character, in a manner to permit of horizontal rotary adjustment, so that the said handle bars may be changed from their normal position to a position wherein they will extend longitudinally of the frame, or to a position directly opposite their normal position, the change of positions being accomplished without disturbing the adjustment of the expander plug or nut 15.

To accomplish the above, there is provided an extension 19, which carries at one end a sleeve 20, the said sleeve being adapted to receive the stem 11, while at its opposite end, the extension 19 is adjustably connected to the handle bars 12 by a clamp 21, or in any other preferred manner. The lower end of the sleeve 20 rests upon a collar or flange 22 which is carried by and preferably formed integral with the stem 11, while the upper end of the said stem is provided with a reduced threaded extension 23 which receives a nut 24. This nut bears upon a shoulder 25 formed at the inner end of the reduced threaded extension 23 and is of sufficient diameter to extend over the upper end of the sleeve 20, so that the said sleeve will be held against longitudinal movement with respect to the stem but will be permitted rotary movement thereon. The length of the sleeve is such as to provide a free working fit between the collar or flange 22 and the nut 24.

In order to hold the sleeve against rotary movement there is provided a locking dog 26, which is mounted upon a pivot pin 27, the latter passing through openings provided in spaced ears 28 extending from and disposed longitudinally of the sleeve 20. These ears are located upon opposite sides of a groove 29 formed in the sleeve and the dog 26 is provided with a tooth 30 which enters this groove and engages any one of a number of notches 31 provided in the collar or flange 22. The dog is normally forced inward so that the tooth 30 will engage these notches, by means of a spring 32, which has one end inserted in a notch formed in the toothed end of the dog and its opposite end bearing against the bottom of the groove 29. A finger piece 33 projects downwardly from the dog 26.

Figure 2:
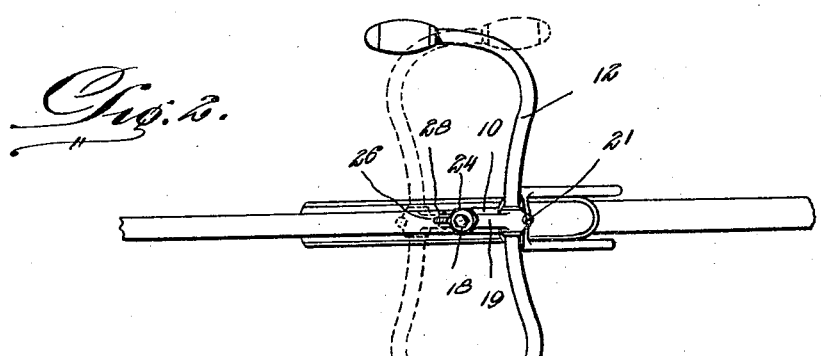
Figure 2 is a top plan view of the same and illustrating by dotted lines the reverse position of the handle bars.
Figure 3:
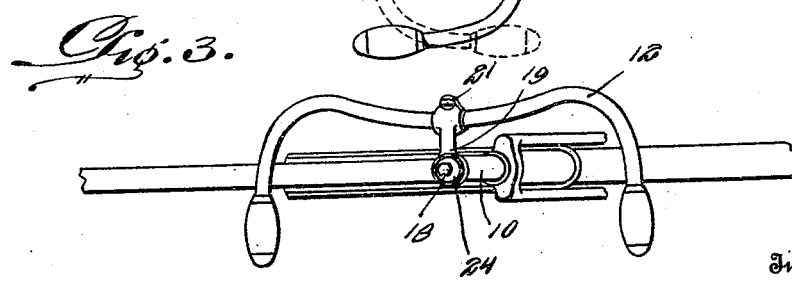
Figure 3 is a view similar to Figure 2 showing another position of the handle bars.

By inserting the finger beneath the finger piece and lifting the dog so as to disengage the tooth 30 from the notch, the sleeve may be rotated about the stem 11 so as to position the handle bars either to the full line position shown in Figure 2, the dotted line shown in that figure, or to the position shown in Figure 3 upon either side of the frame.

The invention is susceptible of various changes in its form, proportions and minor details of construction and the right is herein reserved to make such changes as properly fall within the scope of the appended claims.

Having described the invention what is claimed is:—

1. The combination with a bicycle having an expansible handle-bar stem and an expander bolt extending longitudinally through said stem, of means for securing the handle bar to the stem in a manner to permit of horizontal rotary movement, a spring actuated locking element carried by the handle bar securing means, and means spaced around the stem for causing the locking element to operate to hold the handle bar against movement.

2. The combination with a bicycle having an expansible handle bar stem and an expander bolt extending longitudinally through said stem, of means for securing the handle bars to the stem in a manner to permit of horizontal rotary movement only, a notched collar surrounding the stem and a dog movable with the handle bars to hold the latter against accidental movement.

3. The combination with a bicycle having an expansible handle bar stem and an expander bolt extending longitudinally through said stem, of a detachable handle bar extension having an opening in one end to receive the stem, a collar carried by and surrounding the stem for supporting the extension, means detachably secured to the extension and engageable with the extension for holding the latter against independent upward movement and means carried by the extension and engageable with the collar to hold the extension in adjusted position.

In testimony whereof I affix my signature.

CHARLES F. FILOR.